United States Patent
Soundararajan

(12) 
(10) Patent No.: US 7,039,113 B2
(45) Date of Patent: May 2, 2006

(54) SELECTIVE DECODING OF ENHANCED VIDEO STREAM

(75) Inventor: Aravind Soundararajan, Ossining, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 700 days.

(21) Appl. No.: 09/981,143

(22) Filed: Oct. 16, 2001

(65) Prior Publication Data

US 2003/0072375 A1     Apr. 17, 2003

(51) Int. Cl.
*H04N 7/12* (2006.01)

(52) U.S. Cl. .......................... 375/240.25; 375/240.08; 382/243

(58) Field of Classification Search .......... 375/240.25, 375/240.12, 240.05, 240.1, 240.08; 370/468, 370/395.65; 708/203; 348/414.1; 382/243, 382/249

See application file for complete search history.

(56) References Cited

U.S. PATENT DOCUMENTS

| | | | |
|---|---|---|---|
| 5,349,383 A * | 9/1994 | Parke et al. | ............. 375/240.1 |
| 5,515,377 A * | 5/1996 | Horne et al. | ........... 370/395.64 |
| 5,988,863 A * | 11/1999 | Demos | ........................ 708/203 |
| 6,041,143 A | 3/2000 | Chui et al. | .................. 382/232 |
| 6,275,531 B1 * | 8/2001 | Li | ......................... 375/240.12 |

* cited by examiner

*Primary Examiner*—Gims Philippe
(74) *Attorney, Agent, or Firm*—Michael J. Ure

(57) ABSTRACT

An MPEG decoding system selectively decodes MPEG enhanced streams, based on a select identification of an enhancement region of a series of image frames. MPEG blocks within the enhancement region are decoded with the enhancement-layer, while blocks outside the enhancement region are decoded at the base-layer. Additionally, the user is provided the option of displaying the series of images in a window that is selectively sized to contain only the enhancement region, or the enhancement region surrounded by a base-layer region, or a custom sized window that may include all or some of the enhancement and base-layer regions.

18 Claims, 2 Drawing Sheets

SELECTIVE DECODING OF ENHANCED VIDEO STREAM

BACKGROUND OF THE INVENTION

1. Field of the Invention

This invention relates to the field of video processing, and in particular to the decoding of enhanced video in a select window within an MPEG base-layer window.

2. Description of Related Art

MPEG encoding of video images supports the use of "Scalable Extensions" to a base-layer video stream. A scalable video stream is configured to allow decoders of different complexity to process the stream, to produce decoded images of different quality. The MPEG scalable extensions include, for example, spatial, temporal, SNR, data, and others.

A spatial extension to an MPEG encoding adds a higher-resolution encoding of the images to an encoding of a lower-resolution base-layer. If a user's processing power is limited, the user may choose to decode only the base-layer, to assure continuous streaming at the encoded frame rate. Alternatively, the user may choose to also decode the enhancement-layer to obtain higher resolution images, albeit with the potential for 'freeze' frames, or other visual anomalies, if the decoding process is not able to keep up with the encoded frame rate.

A temporal extension to an MPEG encoding adds additional frames to the base-layer frames. The base-layer frames are encoded at a somewhat low frame rate, and the additional frames increase the frame rate. Depending upon the processing power available, a user may choose to view either the low frame rate sequences of images, or the high frame rate sequences. Again, however, if the processing power is insufficient to support the decoding of the images at the higher frame rate, visual anomalies will occur.

In like manner, the SNR extension adds material to the base-layer images to improve the signal-to-noise ratio of the displayed images, and the data extension allows less-critical data, such as high-frequency components of the image, to be omitted from a base-layer encoding, and supplied by the optionally selectable data extension.

In each of the above examples, the user is generally provided an "all or nothing" choice. Either the spatial enhancement decoding is on, or it's off; additional frames are added, or they're not; and so on. A conventional method of allowing for intermediate choices is to provide different levels of each enhancement. For example, a medium-resolution enhancement-layer may be provided, and the high-resolution enhancement-layer is built upon the medium-resolution enhancement-layer. In this manner, the user can select between low, medium, and high resolution, depending upon the available processing power, and depending upon the user's particular preference for resolution. In this case, however, the user is still provided with an "all or nothing" choice, except with varying definitions of "all". That is, if the user selects "medium" resolution, all frames will be decoded at the medium resolution. If the decoding processor cannot keep up with the decoding of the medium resolution, visual anomalies occur.

BRIEF SUMMARY OF THE INVENTION

It is an object of this invention to allow a user more versatility in the selective decoding of enhanced MPEG streams. It is a further object of this invention to provide a system and method wherein a user may selectively enhance particular regions of a series of image frames. It is a further object of this invention to provide a system and method wherein a user may selectively display regions of a series of enhanced image frames.

These objects and others are achieved by a system and method that selectively decodes MPEG enhanced streams, based on a select identification of an enhancement region of a series of image frames. MPEG blocks within the enhancement region are decoded with the enhancement-layer, while blocks outside the enhancement region are decoded at the base-layer. Additionally, the user is provided the option of displaying the series of images in a window that is selectively sized to contain only the enhancement region, or the enhancement region surrounded by a base-layer region, or a custom sized window that may include all or some of the enhancement and base-layer regions.

BRIEF DESCRIPTION OF THE DRAWINGS

The invention is explained in further detail, and by way of example, with reference to the accompanying drawings wherein.

Throughout the drawings, the same reference numerals indicate similar or corresponding features or functions.

DETAILED DESCRIPTION OF THE INVENTION

In accordance with this invention, a user is provided the opportunity to identify a region within a video image for providing extended MPEG decoding. By isolating the extended MPEG decoding to a subset of the entirety of the video image, the additional processing time required for providing an extended MPEG decoding is substantially reduced. For example, in an 800×1600 display, reducing the enhanced decoding to the center 600×1200 reduces the enhanced decoding by almost a half, yet the length and the height in each dimension is only reduced by a quarter. Thus, if a user's processing power is insufficient to generate the enhanced decoding for all of the 800×1600 display area without introducing 'freeze' frames or other anomalies, the user may prefer to reduce the enhanced area, rather than viewing the anomalies, and rather than completely abandoning the enhanced decoding. By allowing the user to select an enhancement region, rather than merely selecting whether the enhancement is on or off, this invention allows the user to optimize the decoding, based on the user's preference, and based on the user's system's capabilities.

This invention is presented using the paradigm of a spatial extension to an MPEG base-layer, although one of ordinary skill in the art will recognize that the principles of this invention are application to any extension to a basic encoding that is area dependent. This invention is particularly well suited, for example, to the aforementioned SNR extension to MPEG. If noise, for example, is readily apparent in a particular region, due to its prominence, or its particular color scheme, the user can select the region for improvement, by the decoding of the SNR extension within that region. Although the invention is presented in the context of an MPEG encoding, the principles of the invention are applicable to any encoding that comprises an encoding of information at a base-layer and a supplemental encoding of enhancements to the information. For example, if an audio stream is encoded as a base-layer and an enhancement-layer, a user may be provided the option of enhancing sounds in a particular frequency range, or sounds from a particular source, assuming the source is identifiable.

Figure 1:
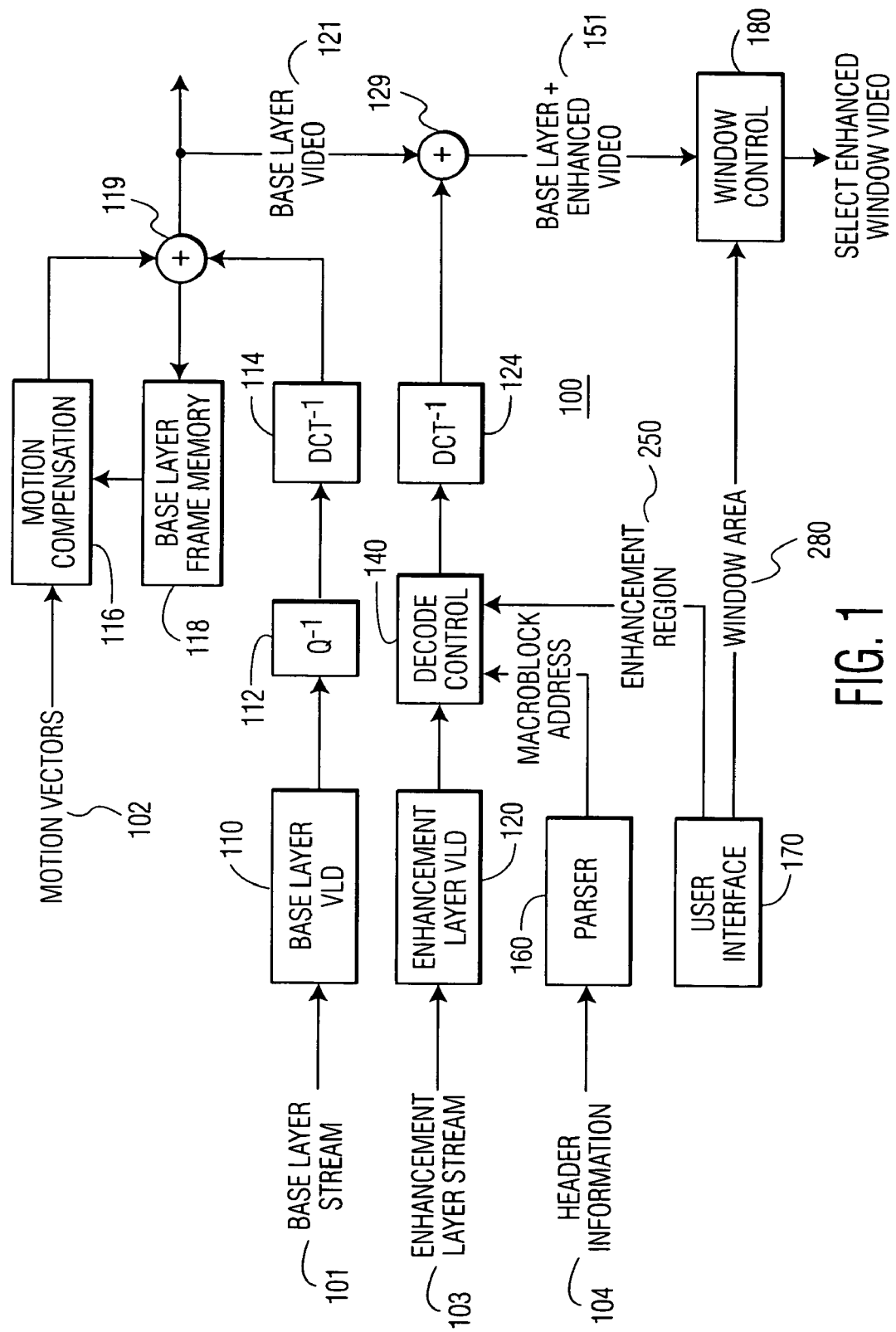
FIG. 1 illustrates an example block diagram of a decoding system in accordance with this invention.

FIG. 1 illustrates an example block diagram of a decoding system 100 in accordance with this invention. The blocks 110–119 include a conventional MPEG decoder. The blocks 120–129 include a conventional spatial extension enhancement to the conventional MPEG decoder 110–119, with a decode controller 140 intersecting the path of the enhanced video stream between block 120 and 122, in accordance with this invention.

At the base-layer, the MPEG base-layer stream 101 and corresponding motion vectors 102, if any, are received by a variable-length decoder (VLD) 110, and motion compensator 116, respectively. The variable-length decoder 110 expands the bit-length encoded MPEG stream 101 into an explicit series of bits. This series of bits corresponds to a quantized encoding of an original input image, organized as MPEG MacroBlocks. Each macroblock contains quantized DCT values corresponding to four 8×8 blocks of pixels. Depending upon the color space encoding scheme used, the macroblock may range from a "4:2:0 macroblock" that comprises six DCT encodings of the four 8×8 blocks (four luminance, two chrominance), to a "4:4:4 macroblock" that comprises twelve DCT encodings of the four 8×8 blocks (four luminance, four Cb chrominance, and four Cr chrominance). Other encoding schemes may also be used. An inverse quantizer 112 decodes these values into the appropriate DCT values, which are transformed into the corresponding 8×8 pixel values by the inverse DCT device 114.

Initial macroblocks are fully described by the base-layer stream 101, and are stored in the base-layer frame memory 118. Subsequent macroblocks may be described as changes to existing macroblocks, using the motion vectors 102 to describe a translation of a stored macroblock to the current macroblock's location, and the macroblock stream 101 to define changes ("error terms") of the macroblock relative to the stored macroblock. The macroblock error terms are decoded by the VLD 110, the inverse quantizer 112, and the inverse DCT device 114, as discussed above. The motion compensation device 116 effects the translation of the stored macroblock, and other processing, such as combining multiple macroblocks. The translated macroblock and the decoded error terms are summed by the summer 119, and stored in the base-layer frame memory 119.

As each decoded macroblock is produced, it is available as an output of the summer 119, as base-layer video 121. This video information may be displayed directly, or combined with information from the enhancement-layer stream 103 to produce an enhanced image output 151.

In a conventional spatial enhancement, the enhancement-layer stream 103 is decoded by a variable-length decoder (VLD) 120, and an inverse DCT device 124, substantially equivalent to the VLD 110 and inverse DCT 114 devices discussed above, to form decoded macroblocks of enhancement data. A summer 129 combines this enhancement data with the base-layer video information 121 to produce enhanced video data 151, suitable for display.

In like manner, in a conventional temporal enhancement, the enhancement-layer stream 103 corresponds to frames of additional video information, including the use of motion vectors and macroblocks from the base-layer, as well as fully defined macroblocks for newly added image information.

An interleaving device (not illustrated) inserts the additional frames into a base-layer video stream 121 to provide a higher frame-rate video output.

Similarly, in a conventional data enhancement, the output of the enhancement-layer VLD 120 is combined with the output of the base-layer VLD 110 to provide the high-frequency DCT terms for the inverse DCT process at the device 114.

Figure 2:
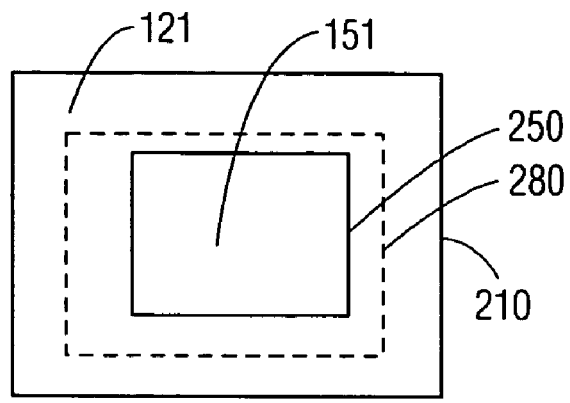
FIG. 2 illustrates an example display of selectively enhanced video information in accordance with this invention.

In accordance with this invention, a user is provided the option of identifying a region in the video image for selective enhancement of the image, as illustrated in FIG. 2. Note that, generally, selective MPEG processing of images is not feasible, because of the use of motion vectors 102 to reduce bandwidth requirements. The use of motion vectors 102 relies upon the availability of stored macroblocks in the frame memory 118. The referenced stored macroblock may come from any location within the image frame, and thus all macroblocks must be fully processed by the devices 110–114, and stored in the frame memory 118 for possible use by a subsequent macroblock.

FIG. 2 illustrates a video image frame 210, within which a region 250 is defined for enhanced video display in accordance with this invention. Typically, a user defines the region 250 by drawing a bounding box on a display device, although any other means of identifying a region within a larger area may be used, including the selection, for example, of predefined border area sizes. Relative to FIG. 1, in accordance with this invention, the enhanced video data 151 is displayed in the region 250, while the base-layer video data 121 is displayed outside the region 250. In this manner, the processing resources required to produce enhanced video data can be reduced, while still providing enhanced video images in the region of interest 250. For example, while watching a sporting event, most of the 'action' typically occurs in the center region of the screen. It is in this center region that a typical user will want, for example, the higher resolution provided by spatial enhancements, or the higher-frequency response provided by data enhancements, so that the action events can be viewed more clearly. At the same time, processing time and resources are not consumed to provide enhanced video at the periphery of the display.

Returning to FIG. 1, a user interface 170 allows the user to define the aforementioned enhancement region 250. A parser 160 decodes the MPEG header information 104 to determine the location of each macroblock as it is received. A decode controller 140 receives the definition of the enhancement region 250, and the current macroblock address, and determines whether the current macroblock is within the enhancement region 250. If the current macroblock is within the enhancement region 250, the enhancement-layer bit stream from the VLD 120 corresponding to this macroblock is forwarded to the inverse DCT device 124, to provide the enhanced information for combining with the base-layer video data 121. If the current macroblock is not within the enhancement region 250, the enhancement-layer bit stream is not provided to the inverse DCT device 124, and the inverse DCT device 124 will not add any information to the base-layer video data 121. Thus, the time and resources generally consumed by decoding the enhancement-layer video is avoided for macroblocks that are outside the enhancement region 250.

Note that, for ease of understanding, the reference numerals 121 and 151 are used herein to distinguish between macroblocks that are and are not enhanced, respectively. As would be evident to one of ordinary skill in the art, in a preferred embodiment, a separate base-layer video stream 121 and separate enhanced video stream 151 will not be provided to the display device to produce the image illustrated in FIG. 2. Instead, because the output of the summer 129 includes both the unaltered base-layer video 121 for the macroblocks outside the enhancement region 250, as well as the enhanced video stream 151 for the macroblocks within the enhancement region 250, this combined output of the summer 129 is provided to the display device.

In the context of temporal enhancement, wherein additional frames are inserted between base-layer frames, the enhancement information generally contains the changes in the image frame between the time of a first base-layer image and the time of a next base-layer image. If the changes in the frame do not occur within the enhancement region 250, the first base-layer image can be substituted for the additional frame (i.e. displayed during the intervening period), and the additional frame need not be decoded.

With particular regard to conventional MPEG decoding, frames are defined as I, P, and B frames. All I and P frames in the base-layer stream 103 are decoded, to provide the reference macroblocks in the frame memory 118. In the context of this invention, however, a B frame is considered to be a temporal enhancement, although it may be included in the base-layer stream 103. B frames commonly occur when new information is added to an image, such as the new items produced in the image when a door in the image is opened. In an alternative embodiment of this invention, the decode control 140 is configured to also control the communication of B-frame base-layer information from the VLD 100. If the new information in the B frame is outside the enhancement region 250, the B frame is not decoded, thereby saving additional processing time. This and other alternative embodiments of this invention will be evident to one of ordinary skill in the art in view of this disclosure.

In accordance with a second aspect of this invention, the user is also provided the option of selecting the amount of the overall image 210 to be displayed. In the aforementioned viewing of a sports event, the user will likely choose to display the entire image 210, including both enhanced 151 and unenhanced 121 image information. Alternatively, in viewing other images, such as images from a museum and the like, the user may choose to only display the selected enhanced region 250. In a preferred embodiment, the user is provided a choice between these two common viewing modes, and is also provided the opportunity to select a custom-sized window, as illustrated by the dashed outline 280 in FIG. 2. This custom-sized window 280 will contain some or all of the unenhanced 121 and enhanced 151 image information, as the user prefers.

Referring to FIG. 1, the selected window area 280 is provided to a window control device 180, that selectively 'crops' the image information from the summer 129 before forwarding it to a display device.

Although the invention is described above in the context of a display of video images, it is also applicable for composing video images. Interesting video effects can be achieved by selectively enhancing portions of an image. In this context, a user may be provided the option of choosing multiple regions 250 for enhancement, and the output of the summer 129 may be provided to an MPEG encoding device for subsequent transmission or processing.

Figure 3:
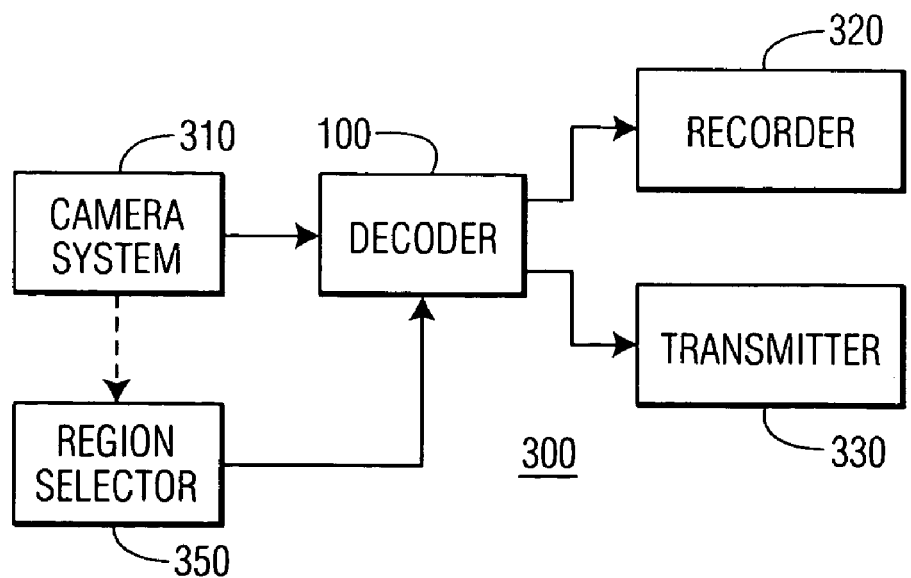
FIG. 3 illustrates an example block diagram of an image processing system in accordance with this invention.

FIG. 3 illustrates an example block diagram of an image processing system 300 in accordance with this invention. In the system 300, a camera system 310, or other video source, provides the base-layer input and enhancement-layer input to a decoder 100 that selectively enhances one or more regions of the field of view of the camera system 310. The selectively enhanced images are provided to a recorder 320 or a transmitter 330, or both, for subsequent display and/or processing.

The image processing system 300 of FIG. 3 is particularly well suited for remote surveillance applications, wherein particular regions within a camera's field of view are more significant, or sensitive, than others, such as entry and exit doors, bank teller windows, bank vaults, and so on. To minimize transmission time and/or storage costs, peripheral regions in an surveillance area may be transmitted and/or recorded at the base-level, and only the sensitive areas recorded at a higher resolution, or with a higher signal-to-noise ratio.

The foregoing merely illustrates the principles of the invention. It will thus be appreciated that those skilled in the art will be able to devise various arrangements which, although not explicitly described or shown herein, embody the principles of the invention and are thus within its spirit and scope. For example, the invention is described in the context of a manual selection of an enhancement region. Alternatively, or in addition to the manual selection, the control device 140 may be controlled automatically or semi-automatically. In the example system of FIG. 3, the region controller 350 may be an image recognition device, wherein, when a particular pattern or color in the field of view of the camera system 310 is recognized, the controller 350 automatically creates a bounding region 250 about the pattern for subsequent enhancement processing. In the aforementioned surveillance system example, the controller 350 may be configured to selectively record or transmit flesh-tone regions in the image as enhanced video 151, to facilitate facial recognition. Additionally, although the VLD components 110 and 120, and the DCT components 114 and 124, are illustrated as separate components, the VLD function and the DCT function may be provided to both the base-layer stream 101 and the enhanced layer stream 103 by common VLD and DCT components. These and other system configuration and optimization features will be evident to one of ordinary skill in the art in view of this disclosure, and are included within the scope of the following claims.

I claim:

1. A decoder comprising: base-layer components that are configured to decode a base-layer input stream, and to produce therefrom a base-layer output stream, enhancement-layer components that are configured to decode an enhancement-layer input stream, and to produce therefrom information that supplements the base-layer output stream to provide an enhanced output stream, and a controller, operably coupled to the enhancement-layer components, that is configured to control the decoding of the enhancement-layer input stream, based on a user-defined subset of the base-layer output stream;

wherein the base-layer input stream corresponds to an encoding of a series of image frames, and the defined subset of the base-layer output stream includes a defined region within the image frames that is smaller in size than the image frames.

2. The decoder of claim 1, wherein the enhancement-layer input stream corresponds to at least one of: a spatial enhancement, a temporal enhancement, a data enhancement, and a signal-to-noise enhancement.

3. The decoder of claim 2, wherein the temporal enhancement includes MPEG B-frames.

4. The decoder of claim 1, further including a second controller that is configured to extract at least a portion of the enhanced output stream and the base-layer output stream for rendering to a display device.

5. The decoder of claim 1, wherein the base-layer components include: a base-layer variable-length decoder that is configured to provide a series of DCT encodings from the base-layer input stream, an inverse discrete-cosine-transform, operably coupled to the base-layer variable-length decoder, that is configured to provide direct-coded pixel values and error-term values corresponding the series of DCT encodings, a motion compensation device that is configured to receive motion vectors corresponding to prior pixel values and to produce therefrom translated pixel values, and a summer that is configured to combine the translated pixel values and the error-term values to produce motion compensated pixel values, and wherein the base-layer output stream includes the direct-coded pixel values and the motion compensated pixel values.

6. The decoder of claim 5, wherein the enhancement-layer components include: an enhancement-layer variable-length decoder that is configured to provide a series of enhancement DCT encodings from the enhancement-layer input stream, an enhancement inverse discrete-cosine-transform, operably coupled to the enhancement-layer variable-length decoder, that is configured to provide enhancement values corresponding the series of enhancement DCT encodings, and a second summer that is configured to combine the enhancement values to the base-layer output stream to produce the enhanced output stream.

7. The decoder of claim 5, wherein the enhancement-layer input stream corresponds to an enhancement frame, and includes motion vectors relative to the base-layer input stream, and the enhancement-layer components include an interleaver that is configured to insert the enhancement frame into the base-layer output stream to produce the enhanced output stream.

8. The decoder of claim 1, further including a user interface, operably coupled to the controller, that is configured to facilitate identifying the defined subset.

9. A image processing system comprising: a camera system that is configured to provide a base-level input stream and a corresponding enhancement-level stream, a base-level decoder that is configured to provide a base-level output stream corresponding to the base-level input stream, an enhancement-level decoder that is configured to provide an enhancement stream corresponding to the enhancement-level stream, a combiner that is configured to combine the enhancement stream to the base-level output stream to produce an enhanced output stream, and a controller that is configured to control the enhancement-level decoder to selectively decode the enhancement-level stream to provide the enhancement stream, based on a defined region of a field of view of the camera system.

10. The image processing system of claim 9, wherein the defined region of the field of view is based on at least one of: a user selection, a location parameter, a pattern recognition, and a color recognition.

11. A method of providing an enhanced output stream, comprising: receiving a base-layer input stream, receiving an enhancement-layer input stream, decoding the base-layer input stream to provide a base-layer output stream, selectively decoding the enhancement-layer input stream, based on a user-defined subset of the base-layer output stream, to provide an enhancement output stream, and combining the base-layer output stream and the enhancement output stream to provide the enhanced output streams;

wherein the base-layer input stream corresponds to an encoding of a series of image frames, and the defined subset of the base-layer output stream includes a defined region within the image frames that is smaller in size than the image frames.

12. The method of claim 11, wherein the enhancement-layer input stream corresponds to at least one of: a spatial enhancement, a temporal enhancement, a data enhancement, and a signal-to-noise enhancement.

13. The method of claim 12, wherein the temporal enhancement includes MPEG B-frames.

14. The method of claim 11, further including extracting at least a portion of the enhanced output stream and the base-layer output stream for rendering to a display device.

15. The method of claim 11, wherein decoding the base-layer input stream includes: decoding variable-length bit streams in the base-layer input stream to provide a series of DCT encodings, decoding, via an inverse discrete-cosine-transform, the series of DCT encodings to provide direct-coded pixel values and error-term values, receiving motion vectors corresponding to prior pixel values, producing translated pixel values from the prior pixel values, and combining the translated pixel values and the error-term values to produce motion compensated pixel values, and wherein the base-layer output stream includes the direct-coded pixel values and the motion compensated pixel values.

16. The method of claim 15, wherein decoding the enhancement-layer input stream includes: decoding variable-length bit streams in the enhancement-layer input stream to provide a series of enhancement DCT encodings, decoding, via an enhancement inverse discrete-cosine-transform-, the series of enhancement DCT encodings to produce enhancement values, and combining the enhancement values to the base-layer output stream to produce the enhanced output stream.

17. The method of claim 15, wherein the enhancement-layer input stream corresponds to an enhancement frame, and includes motion vectors relative to the base-layer input stream, and interleaving the enhancement frame into the base-layer output stream to produce the enhanced output stream.

18. The method of claim 10, further including providing a user interface to facilitate identifying the defined subset.

* * * * *